United States Patent
Matsunami

[11] Patent Number: 6,135,689
[45] Date of Patent: *Oct. 24, 2000

[54] SELF-LOCKING FASTENER

[75] Inventor: Shigeki Matsunami, Gifu-ken, Japan

[73] Assignee: Aoyama Seisakusho Co., Ltd., Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/081,511

[22] Filed: May 20, 1998

[30] Foreign Application Priority Data

May 27, 1997 [JP] Japan ................... 9-137000

[51] Int. Cl.[7] ................................. F16B 39/30
[52] U.S. Cl. ............................ 411/311; 411/417
[58] Field of Search .................. 411/308–311, 423, 411/417, 418, 188, 304

[56] References Cited

U.S. PATENT DOCUMENTS

| | | |
|---|---|---|
| 2,428,783 | 10/1947 | Cole ....................... 411/418 |
| 2,788,046 | 4/1957 | Rosan ..................... 411/311 |
| 3,182,703 | 5/1965 | Smyth ..................... 411/304 |
| 3,301,299 | 1/1967 | Stanwick . |
| 3,381,733 | 5/1968 | Stanwick . |
| 3,789,644 | 2/1974 | Orlomoski . |
| 3,850,215 | 11/1974 | Orlomoski . |
| 3,878,759 | 4/1975 | Carlson ................... 411/423 |
| 3,901,066 | 8/1975 | Orlomoski . |
| 3,907,017 | 9/1975 | Stanwick . |
| 4,544,312 | 10/1985 | Stencel ................... 411/418 |
| 4,934,491 | 6/1990 | Yamaoka et al. . |
| 5,071,301 | 12/1991 | Engelhardt .............. 411/418 |
| 5,183,359 | 2/1993 | Barth ...................... 411/188 |
| 5,340,254 | 8/1994 | Hertel ..................... 411/311 |
| 5,672,037 | 9/1997 | Iwata ...................... 411/311 |

FOREIGN PATENT DOCUMENTS

| | | |
|---|---|---|
| 46-15561 | 4/1971 | Japan . |
| 50-4453 | 1/1975 | Japan . |
| 52-149550 | 12/1977 | Japan . |
| 1-98342 | 6/1989 | Japan . |
| 565855 | 11/1944 | United Kingdom .......... 411/423 |
| 1394027 | 5/1975 | United Kingdom . |

*Primary Examiner*—Flemming Saether
*Attorney, Agent, or Firm*—Frishauf, Holtz, Goodman, Langer & Chick, P.C.

[57] ABSTRACT

A self-locking fastener wherein crests of respective threads of a part of a group of threads on the self-locking fastener are deformed to provide a group of lock portions so that the respective threads have a cross section of a trapezoidal-shape over an arcuate region of 10 to 40 degrees about an axis of the self-locking fastener in a cross section perpendicular to the axis. In addition a region, in which a group of the lock portions are formed in an axial direction of the self-locking fastener, is such that when the self-locking fastener is screwed into a nut, a major part of the group of lock portions are screwed into threads of the nut.

12 Claims, 6 Drawing Sheets

SELF-LOCKING FASTENER

BACKGROUND OF THE INVENTION

The present invention relates to a self-locking fastener, and more particularly to an earth bolt.

A conventional self-locking fastener is constructed such that crests of a smaller number of threads of the self-locking fastener than that of threads of a nut, into which the self-locking fastener is screwed, are deformed so that the threads have a cross section of a trapezoidal-shape over an arcuate region of 90 degrees about an axis of the self-locking fastener in a cross section perpendicular to the axis, and so that one of the group of the deformed threads, which is disposed at a lowermost axial end, is positioned within the nut when the fastener is screwed into the nut. The deformed thread portions are separated by approximately 180 degrees about the axis of the self-locking fastener, that is, the deformed thread portions in one thread are formed in two positions so as to face each other with the axis of the self-locking fastener therebetween. In addition, since the deformed thread portions have a somewhat smaller flank angle than that of non-deformed thread portions or normal threads, flanks of the deformed thread portions are forcedly brought into close contact with flanks of a nut having normal threads when the self-locking fastener is screwed into the nut, with the result that the deformed thread portions exhibit a looking effect. As used hereinbelow, the deformed thread portions brought into close contact with flanks of the nut are referred to as "lock portions".

The deformed thread portions in such conventional self-locking fastener occupy a half of a circumferential length of a thread which includes the deformed thread portions, so that there is a large contact area between the self-locking fastener and the flanks of a nut, into which the self-locking fastener is screwed. Accordingly, screwing the self-locking fastener into the nut requires a great force (hereinafter, referred to as "screwing torque"), resulting in problems of not only worsening the quality in a screwing operation but also generating heat due to frictional resistance in lock portions to cause seizure of the self-locking fastener onto the nut when the screwing operation is carried out at high speeds by means of an air motor or the like. Further, forced screwing may give rise to fracture of threads of the nut with the result that the self-locking fastener may fall off. As used hereinafter, a force leading to fracture of threads is referred to as "nut fracture torque". In order to avoid such problems, coating the self-locking fastener with a wax prior to the screwing work has been essential. The use of wax leads to not only an increased cost but also to a complicated screwing process.

In the case where a conventional self-locking fastener is used as an earth bolt for automobiles, it is screwed into a nut (welded to a predetermined portion of a vehicle body) which is subjected to a rust preventive treatment together with the vehicle body and surfaces of which are coated with paint. Accordingly, the paint adhered to threads of the nut must be scraped off in the screwing operation in order to ensure electrical conductivity, so that a plurality of grooves in parallel to an axis of the self-locking fastener are formed on a peripheral edge at a lower end of the self-locking fastener to perform scraping-off of the paint in the screwing operation.

SUMMARY OF THE INVENTION

It is an object of the invention to provide a self-locking fastener which enables a screwing operation to be carried out with a small screwing torque without coating of a wax, and which also enables the nut fracture torque to be made large. Further, it is an object of the invention to provide an earth bolt which can exhibit a favorable electrical conductivity without providing any special construction.

The self-locking fastener according to the invention has a feature in that crests of respective threads of a part of a group of threads on the self-locking fastener are deformed to provide a group of lock portions so that the respective threads have a cross section of a trapezoidal-shape over an arcuate region of 10 to 40 degrees about an axis of the self-locking fastener in a cross section perpendicular to the axis. In addition a region, in which a group of the lock portions are formed in an axial direction of the self-locking fastener, is such that when the self-locking fastener is screwed into a nut, a major part of the group of lock portions are screwed into threads of the nut.

It is preferable that said region is wider than a region in which the group of threads of the nut are formed in an axial direction of the nut, the axis of which is coincident with the axis of the self-locking fastener screwed therein and a lowermost lock portion in the group of the lock portions is positioned below an underside of the nut.

It is preferable that a region, in which the lock portions are formed about the axis of the self-locking fastener, is 10 degrees in terms of arcuate angle and that the lock portions are separated by 90 or 120 degrees, and it is particularly preferable that a region, in which the lock portions are formed about the axis, is 30 degrees in terms of arcuate angle and that the lock portions are separated by 180 degrees.

The self-locking fastener according to the invention is suitable for use as an earth bolt, and in that case a serrated portion is preferably formed on a bearing surface of a head of the self-locking fastener.

DESCRIPTION OF THE PREFERRED ENBODIMENTS

A self-locking fastener according to the invention will be described in detail with reference to the accompanying drawings, in which it is used as an earth bolt.

Figure 1:
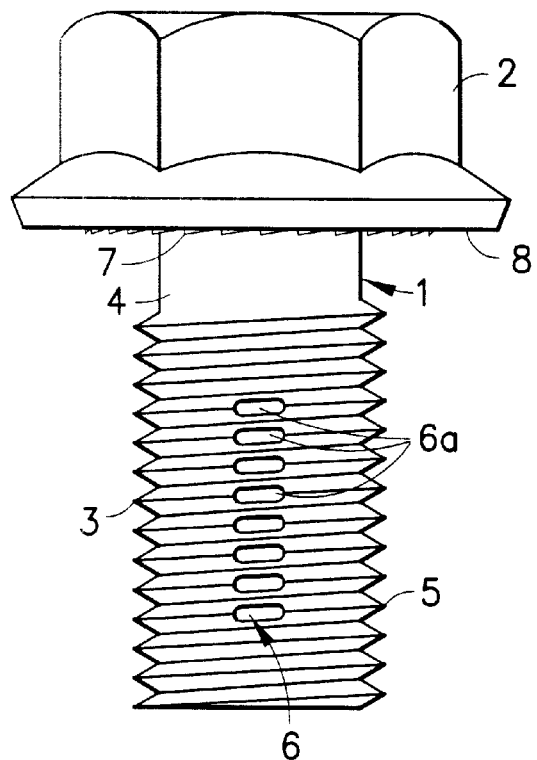
FIG. 1 is a front view showing a general constitution of an embodiment of a self-locking fastener according to the invention.
Figure 2:
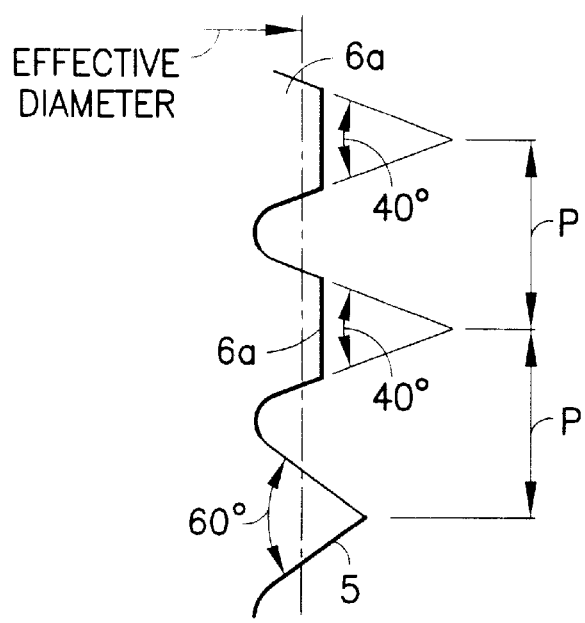
FIG. 2 is an enlarged, cross sectional view showing threads of the embodiment of the self-locking fastener according to the invention, of which crests are deformed, together with conventional threads.
Figure 4:
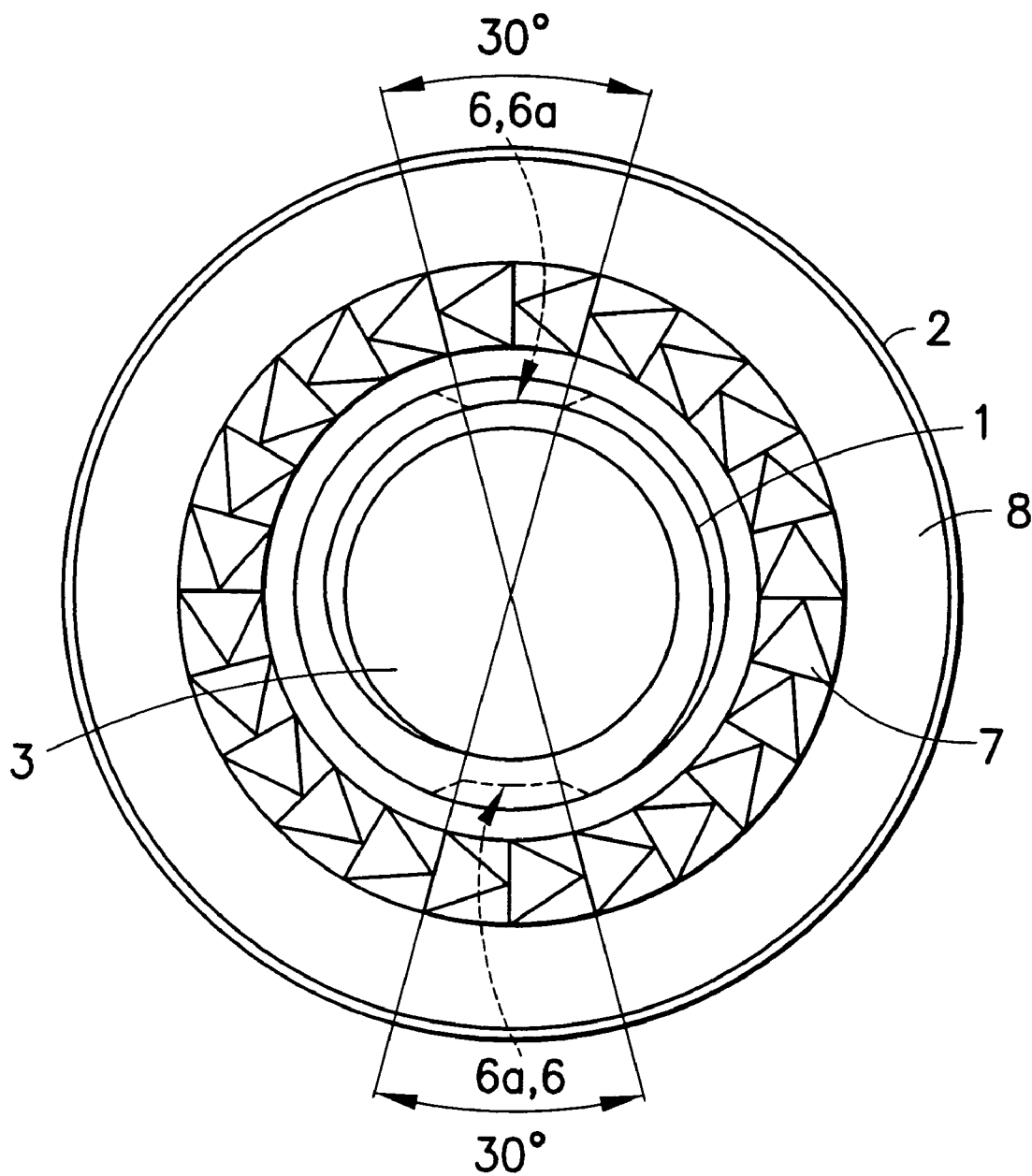
FIG. 4 is a bottom view showing the embodiment of the self-locking fastener according to the invention, of which a bearing surface of a head is formed with serration.

In the figures, the reference numeral 1 designates a bolt, of which surfaces are subjected to chromate treatment in order to enhance electrical conductivity and corrosion resistance, and which comprises a head with a flange 2 and a shank 3, the shank being composed of a body 4 and an effective threaded portion 5 having a thread angle of 60 degrees (see FIG. 2). Formed on the effective threaded portion are lock portions 6 (see FIG. 4) separated by approximately 180 degrees about an axis of the shank. The lock portions comprise a plurality of portions 6a having a cross section of a trapezoidal-shape and a thread angle of 40 degrees, the portions 6a being formed by deforming crests of respective threads of a group of threads having a larger number than that of threads of a nut 11, into which the bolt is screwed, over an arcuate region (see FIG. 4) of 30 degrees about an axis of the bolt as shown in FIG. 2. In addition, it is preferable that a region, in which the lock portions are formed in an axial direction of the shank, is set such that when screwing the bolt into the nut is completed, the lowermost one of the portions 6a, that is, the endmost portion 6a formed in a direction toward a tip end of the shank is positioned below an underside of the nut. Since the bolt 1 is naturally required to have a function as an earth bolt and is also naturally required to have a self-locking function, a region, in which the lock portions are formed on an upper portion of the shank in an axial direction of the shank, is set so that when screwing of the bolt into the nut is completed, a major part of the portion 6a can engage with threads of the nut (flank angles of both the bolt and nut overlap each other by 10 degrees with the result that flanks of the portion 6a are forcedly brought into close contact with flanks of threads of the nut).

Figure 5:
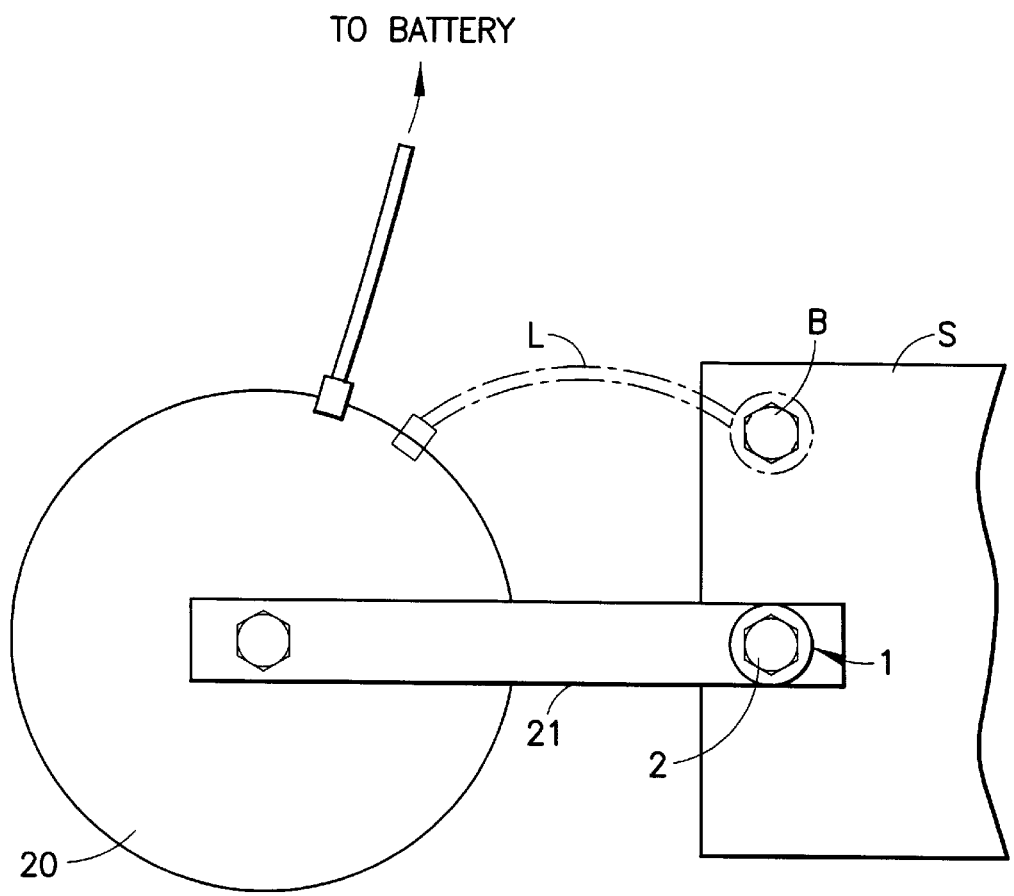
FIG. 5 is a front view showing an embodiment of the self-locking fastener according to the invention used as an earth bolt.

Further, the reference numeral 7 designates a serrated portion composed of a multiplicity of teeth in the form of a substantially quadrangular pyramid and formed on a bearing surface 8 of the head 2 of the bolt, the serrated portion serving to provide assured electrical connection between the bolt 1 and a connection terminal 12. As shown in FIG. 5, when a horn 20 is to be mounted to a steel sheet S on a vehicle body, the bolt 1 is threadedly inserted into a nut (not seen since it is welded to a rear surface of the steel sheet of the vehicle body) welded to the steel sheet of the vehicle body, through a stay 21, which serves to secure the horn to the steel sheet of the vehicle body, and then the serrated portion scrapes off a paint coated on surfaces of the stay, so that exposed, metallic surfaces of the stay come into direct contact with the multiplicity of teeth in the form of a substantially quadrangular pyramid, which constitute the serrated portion, thus having the bolt 1, stay 21 and the steel sheet S of the vehicle body electrically contacting with one another. As a result, an earth cable L and an earth bolt B shown by chain lines in FIG. 5 and used in a conventional manner are dispensed with.

Figure 3:
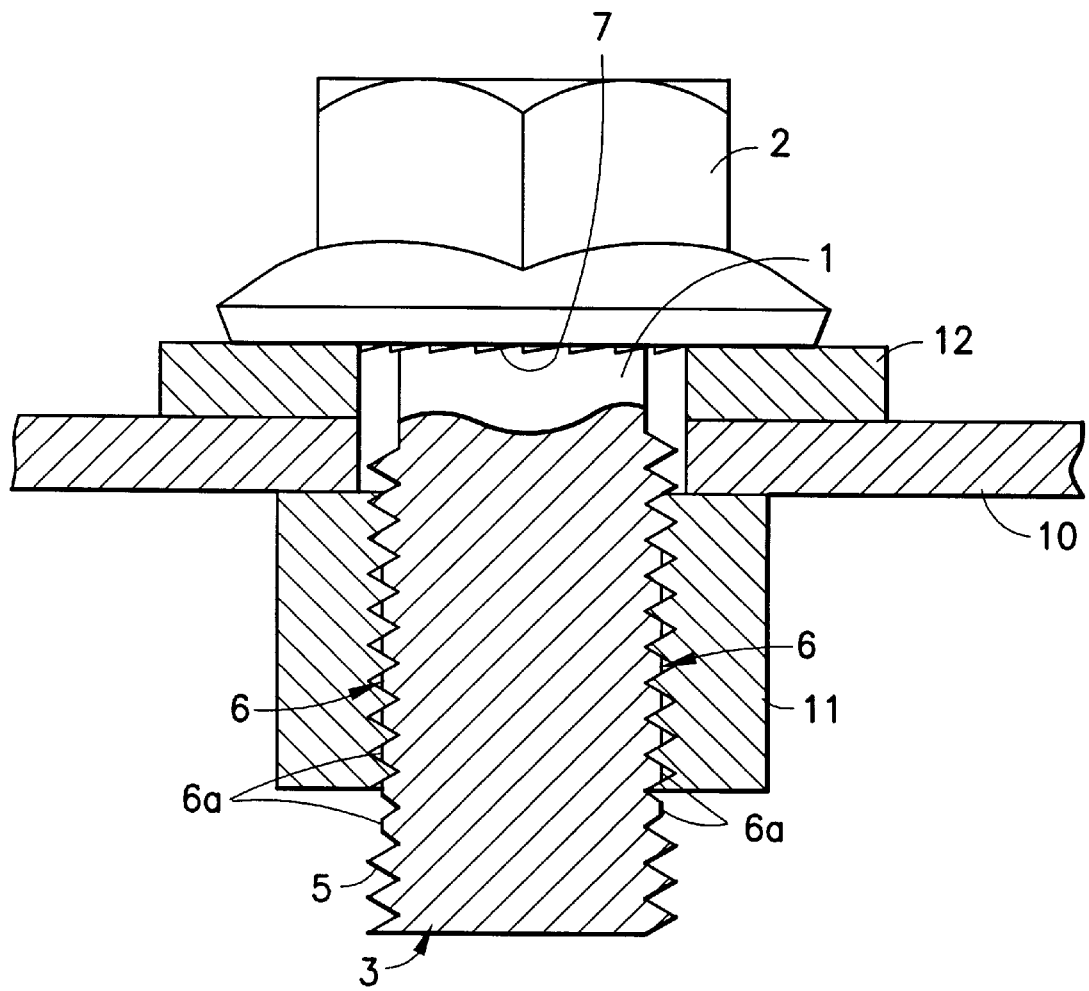
FIG. 3 is a fragmentary cross sectional view showing a state, in which the self-locking fastener according to the invention is screwed into a nut.

As shown in FIG. 3, such earth bolt 1 is threadedly inserted into a nut 11 with a connection terminal 12 (corresponding to the stay 21 in the embodiment shown in FIG. 5) placed coaxial with the nut on an upper surface of a mounted member 10 (corresponding to the steel sheet S of the vehicle body in the embodiment shown in FIG. 5), to an underside of which the nut 11 is welded, and of which surfaces are subjected to coating, and then flanks of a group of the portions 6a of the lock portions 6 having a cross section of a trapezoidal-shape and formed on a predetermined portion of the earth bolt are forcedly brought into close contact with flanks of the nut to be screwed into the nut as the screwing work proceeds, so that paint coated on the nut surfaces is successively scraped off by the flanks of the group of the portions 6a and the screwing operation is completed to bring the earth bolt and the nut into electrical contact with each other when the bearing surface of the earth bolt head finally contacts with an upper surface of the connection terminal. Here, since the nut is welded to the mounted member, electrical contact is naturally made between the earth bolt and the mounted member. When the serrated portion 7 is formed on the bearing surface of the earth bold head as described above, the earth bolt and the connection terminal will be electrically connected to each other through the serrated portion even in the case where paint is coated on surfaces of the connection terminal.

EXAMPLE 1

Figure 6:
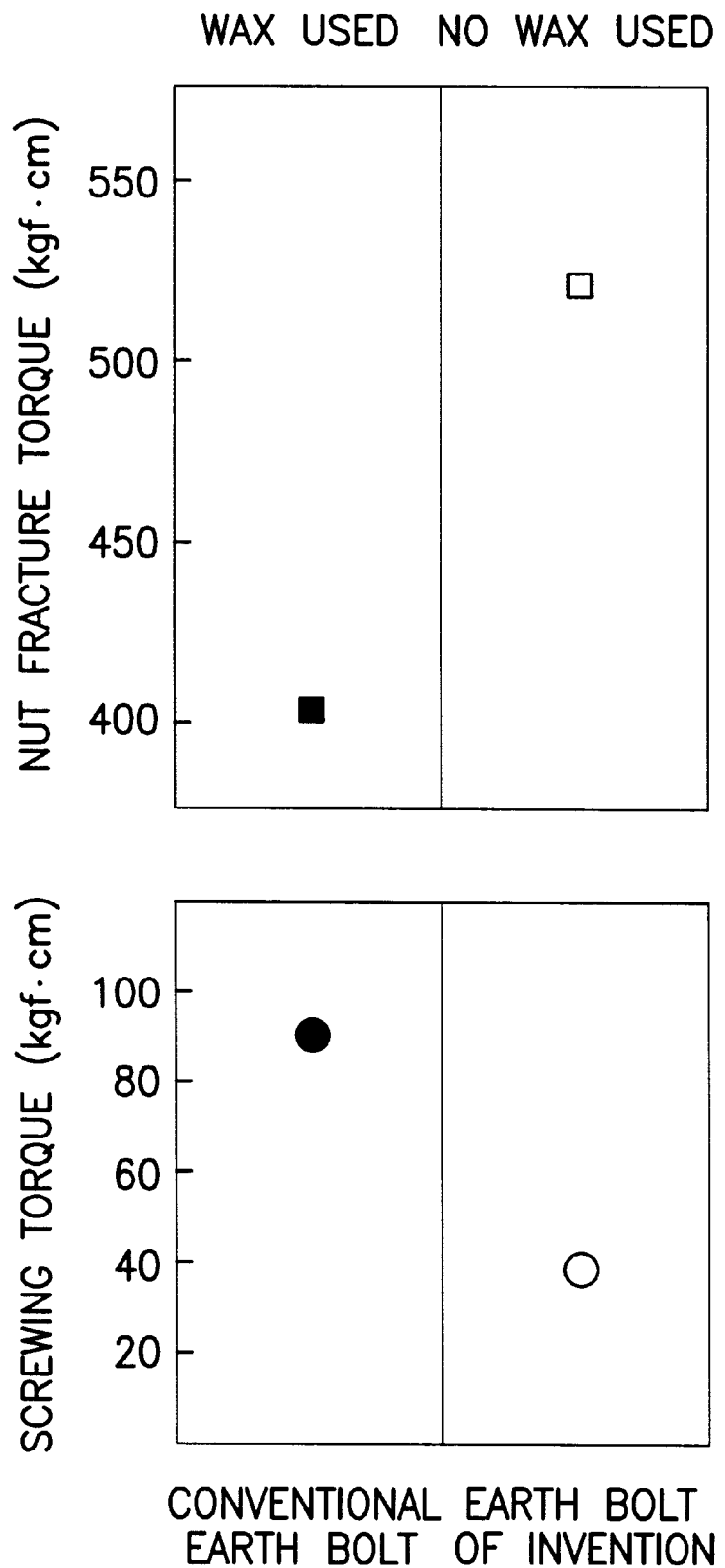
FIGS. 6 and 7 are views showing a performance of the self-locking fastener according to the invention and a performance of a conventional self-locking fastener.

FIG. 6 shows a result of comparison of magnitudes of screwing torque and nut fracture torque between a conventional earth bolt (wherein a region, in which lock portions are formed, are separated by approximately 180 degrees and have an arcuate angle of 90 degrees) and an earth bolt of the invention (wherein a region, in which the lock portions are formed, are separated by approximately 180 degrees and have an arcuate angle of 30 degrees). Incidentally, screwing torque and nut fracture torque were measured in the following manner (values indicated in FIG. 6 are average values of three samples as measured).
(1) Screwing Torque
A minimum value of torque, by which an earth bolt could be threadedly inserted into a nut, was measured by a minute torque testing machine.
(2) Nut Fracture Torque
A torque, by which threads of a nut was broken down when the earth bolt was threadedly inserted into the nut, was measured.

As shown in FIG. 6, the conventional earth bolt exhibited a screwing torque of 45 kgf.cm and a nut fracture torque of 406 kgf.cm, respectively, although a wax was used. In contrast, the earth bolt according to the invention exhibited a screwing torque of 19 kgf.cm and a nut fracture torque of 540 kgf.cm, respectively, while any wax was not used. Thus the earth bolt according to the invention enables carrying out a screwing work with a smaller torque by about 60% than that of the conventional earth bolt and without the use of any wax, and maintaining safety of the screwing work even when a larger torque by about 35% than that of the conventional earth bolt applies.

EXAMPLE 2

Figure 7:
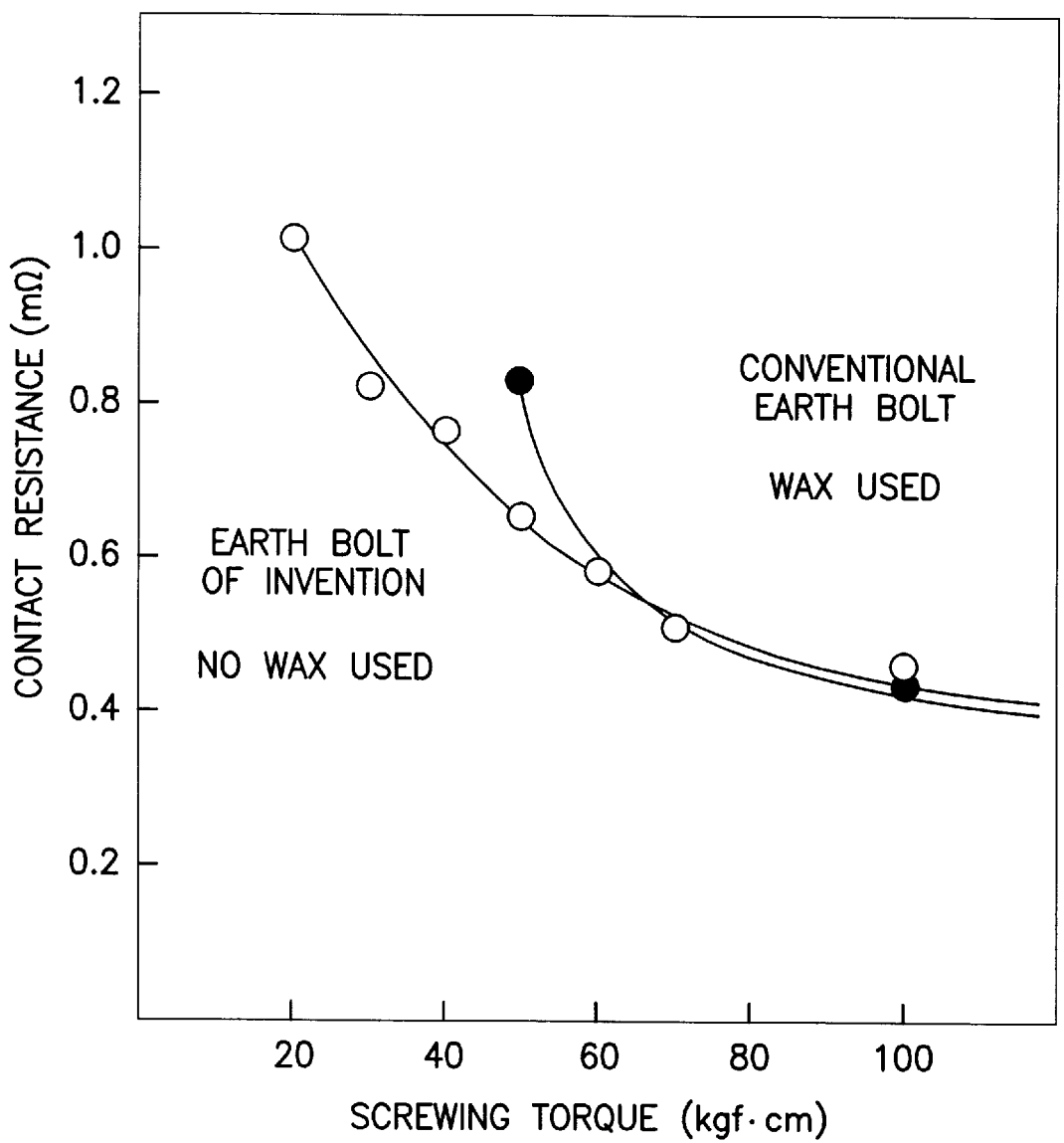

Samples similar to those in Example 1 were prepared and inspected with respect to an earthing performance (a measuring equipment was a digital multi-meter). In inspecting the earthing performance, an electric current of 10 A was passed between a horn stay and a steel sheet of a vehicle body, and a contact resistance therebetween was measured. A contact resistance of 3 Ωm or less came up to a standard for judgement. A result of such inspection is shown in FIG. 7. As shown in FIG. 7, it was found that although a contact area between the earth bolt of the invention and the nut was one-third as small as that between the conventional earth bolt and the nut, the earth bolt according to the invention attained a predetermined earthing performance and provided earthing with a smaller torque by about 60% than that of the conventional earth bolt (a wax was used) and without the use of any wax (a minimum value of a screwing torque, at which a contact resistance could be measured, was 50 kgf.cm for the conventional earth bolt while it was 20 kgf.cm for the earth bolt according to the invention).

As described above, the invention enables a self-locking fastener screwing operation to be carried out with an exceedingly small torque and without the use of any wax, thereby significantly improving a quality of a screwing operation.

The self-locking fastener according to the invention is so large in nut fracture torque as to provide an extremely small possibility of generating trouble due to seizure or the like in high speed screwing with the use of an air motor and the like. Further, since the self-locking fastener according to the invention attains a predetermined earthing performance without any special arrangement for scraping-off paint, it can be used as an earth bolt as well as reducing its manufacturing cost.

What is claimed is:

1. A combination of an earth bolt and a nut, said earth bolt comprising;

a body having a threaded portion that includes a plurality of threads; and a plurality of lock portions formed by deforming crests of respective ones of said threads to have a cross section of a trapezoidal-shape over an arcuate region of 10 to 40 degrees about an axis of said earth bolt, said lock portions being formed at intermediate positions between ends of the threaded portion;

wherein said lock portions have a thread angle which is smaller than a thread angle of a portion of the threaded portion whose threads do not have deformed crests; and wherein a lowermost one of the lock portions is positioned below an underside of the nut when the earth bolt is screwed into the nut;

whereby a favorable electrical conductivity between the earth bolt and the nut is achieved.

2. The combination of an earth bolt and a nut according to claim 1, wherein:

the arcuate region in which the lock portions are formed is wider than a region in which threads of the nut are formed in an axial direction of the nut; and an axis of said nut is coincident with the axis of the earth bolt when the earth bolt is screwed into the nut.

3. The combination of an earth bolt and a nut according to claim 2, wherein the arcuate region in which said lock portions are formed is 10 degrees in terms of arcuate angle, and said lock portions are formed in at least two groups which are separated by approximately 90 or 120 degrees.

4. The combination of an earth bolt and a nut according to claim 3, further comprising a head formed on said body, and a serrated portion formed on a bearing surface of said head.

5. The combination of an earth bolt and a nut according to claim 2, wherein the arcuate region in which said lock portions are formed is 30 degrees in terms of arcuate angle, and said lock portions are formed in two groups which are separated by approximately 180 degrees.

6. The combination of an earth bolt and a nut according to claim 5, further comprising a head formed on said body, and a serrated portion formed on a bearing surface of said head.

7. The combination of an earth bolt and a nut according to claim 2, further comprising a head formed on said body, and a serrated portion formed on a bearing surface of said head.

8. The combination of an earth bolt and a nut according to claim 1, wherein the arcuate region in which said lock portions are formed is 10 degrees in terms of arcuate angle, and said lock portions are formed in at least two groups which are separated by approximately 90 or 120 degrees.

9. The combination of an earth bolt and a nut according to claim 8, further comprising a head formed on said body, and a serrated portion formed on a bearing surface of said head.

10. The combination of an earth bolt and a nut according to claim 1, wherein the arcuate region in which said lock portions are formed is 30 degrees in terms of arcuate angle, and said lock portions are formed in two groups which are separated by approximately 180 degrees.

11. The combination of an earth bolt and a nut according to claim 10, further comprising a head formed on said body, and a serrated portion formed on a bearing surface of said head.

12. The combination of an earth bolt and a nut according to claim 1, further comprising a head formed on said body, and a serrated portion formed on a bearing surface of said head.

* * * * *